United States Patent [19]

Colby

[11] 4,321,754
[45] Mar. 30, 1982

[54] VEHICLE BODY-AND-FRAME ALIGNMENT APPARATUS

[76] Inventor: William Colby, 4431 N. Maple, Fresno, Calif. 93726

[21] Appl. No.: 172,380

[22] Filed: Jul. 25, 1980

[51] Int. Cl.³ .............................................. G01B 5/14
[52] U.S. Cl. .............................. 33/180 AT; 33/174 G; 33/203.2; 33/288; 33/158
[58] Field of Search ................. 33/203, 203.2, 203.21, 33/203.18, 288, 174 G, 174 L, 174 P, 174 PA, 180 AT, 181 AT, 175, 174 J, 158, 15, 1 CC

[56] References Cited

U.S. PATENT DOCUMENTS

| | | | |
|---|---|---|---|
| 1,431,522 | 10/1922 | Hayman | 33/189 |
| 1,465,646 | 8/1923 | Lough | 33/175 |
| 2,341,176 | 2/1944 | Buehig | 33/174 J X |
| 2,853,794 | 9/1958 | Van Winkle | 33/203.17 |
| 3,145,475 | 8/1964 | Alford | 33/175 X |
| 3,210,857 | 10/1965 | Lill | 33/180 AT |

FOREIGN PATENT DOCUMENTS 506147 12/1954 Italy ....................................... 33/175

Primary Examiner—William D. Martin, Jr.
Attorney, Agent, or Firm—Francis X. LoJacono

[57] ABSTRACT

A vehicle body-and-frame-alignment apparatus for use in realigning the front inner structures of damaged unitized or unibody constructed vehicles employing sliding strut-shock units as front-end suspension systems, wherein the apparatus is formed by a substantially rectangular adjustable frame gauge defined by upper and lower horizontal gauge bars adjustably interconnected to oppositely positioned vertical side gauge bars by coupling brackets, each gauge bar including a measuring tape disposed along the longitudinal length thereof. The frame gauge is adapted to be supported on the sliding strut-shock units by an adjustable pair of gauge-positioning members slidably mounted to the upper horizontal bar, the lower horizontal bar being provided with a fixed central indicator and a second pair of gauge-positioning members, each gauge-positioning member including a vertically adjustable reference pointer to indicate structural alignment or misalignment of the vehicle structure.

10 Claims, 9 Drawing Figures

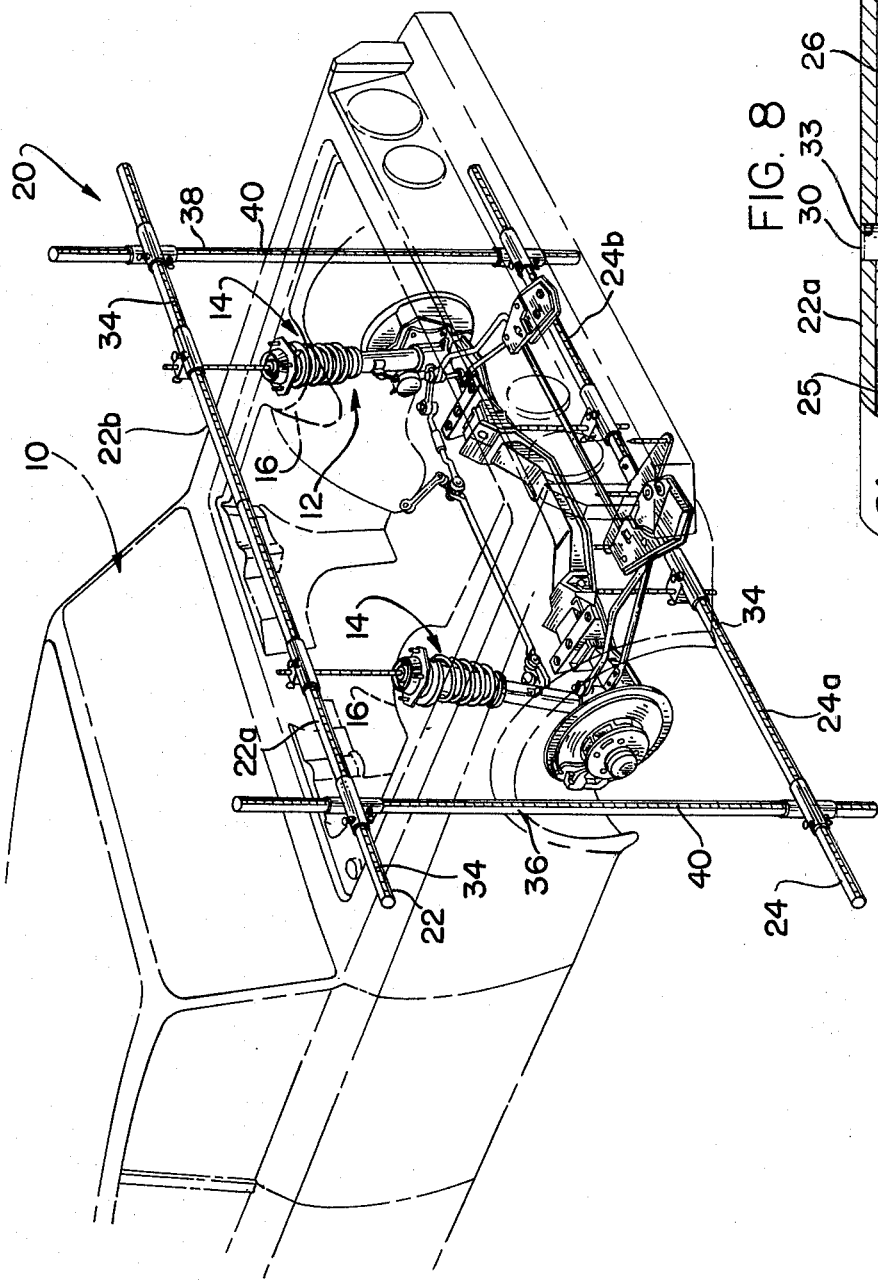
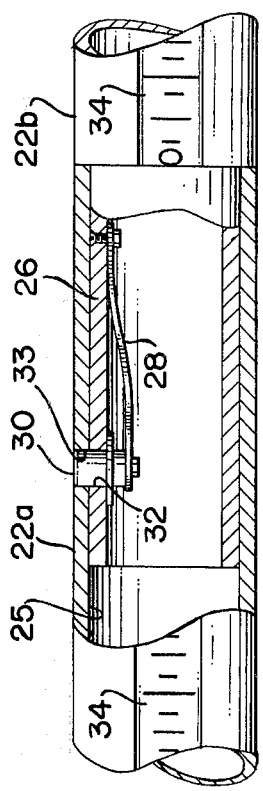
FIG. 1
FIG. 8

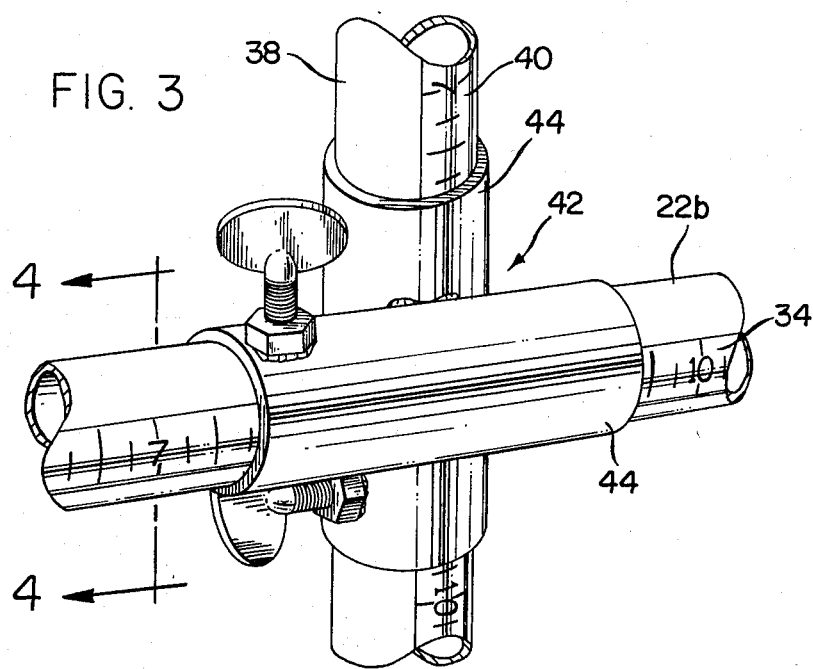
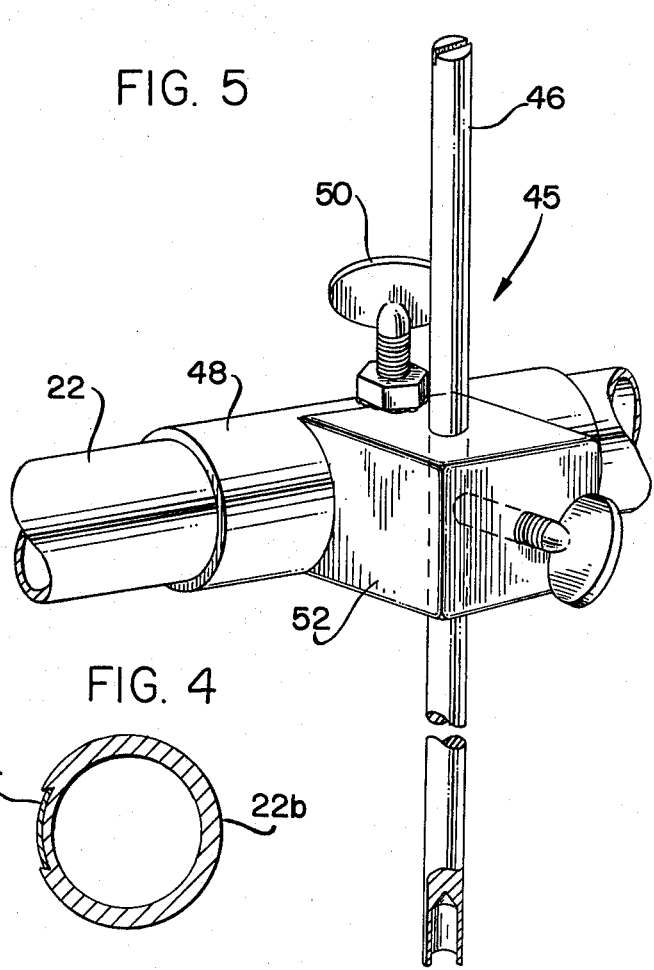
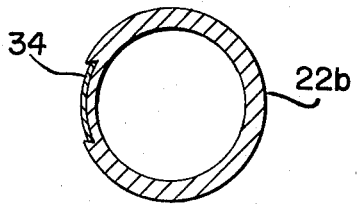
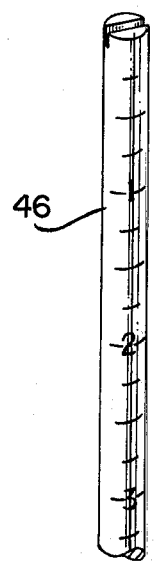
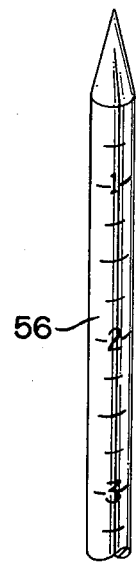

VEHICLE BODY-AND-FRAME ALIGNMENT APPARATUS

BACKGROUND OF THE INVENTION

1. Field of the Invention

This invention relates generally to a body-and-frame gauge apparatus, and more particularly to a gauge apparatus for realigning the front inner structure of a damaged unitized or unibody-constructed vehicle having a sliding strut-shock front-end suspension system, generally known as a McPherson-Strut system.

2. Description of the Prior Art

It is well known in the art that various problems and difficulties are encountered in providing suitable means for gauging damage done to unitized or unibody-constructed automobiles, particularly those automobiles that incorporate the McPherson Strut system. Basically this system comprises a pair of units that include three basic components—a simple lateral link with a ball joint or the like at its outboard end; a unit comprising a sliding strut, a concentric coil spring, and a shock absorber to carry the wheel spindle and the brake; and a drag link that also functions as an anti-sway bar. At present, there are several variations of the basic components of a McPherson-Strut-suspension system.

Since the McPherson-Strut syspension is not adjustable (except for toe-in), it is essential to provide the proper caster-camber alignment. The inner front end structure of the vehicle must be in the correct aligned position—that is, the upper portion of the body must be in central alignment with the lower portion of the body or frame section, with the struts in their respective angular relationship.

Due to the radical changes in the construction of automobiles, a whole new set of collision-damage repair problems have been created. This, in turn, has created a change in the repair methods, whereby the pulling out of damaged areas replaces the old method of pushing them out.

Accordingly, new body-and-frame-repair systems have been generated and employed in the industry. However, there is at present a limited number of systems that can provide total relignment of all the critical components of a damaged automobile. The devices of these systems have features that restrict their use; and they are complicated to operate and prohibitively expensive for the average body-repair shop to install.

One such system that is capable of total relignment control includes a laser unit and electro-optical measurement devices. This unit cannot be operated by the average shop mechanic.

Another relaignment system which is in general use is the providing of several self-centering frame gauges mounted to the understructure of the automobile. The use of these frame gauges allows one to diagnose the damage to the understructure, which cannot be readily detected without the use of measuring devices. These gauges measure side-to-side and up-and-down types of damage. This system allows for perfect alignment of the understructure, but it is not readily useable in the re-alignment of the inner front end of an automobile or the related strut suspension therein.

However, after the above device is employed and the understructure is in perfect alignment, the present apparatus can be used to complete total alignment of the automobile.

SUMMARY OF THE INVENTION

The present invention has for an important object to provide a means by which the damaged front inner end of an automobile can be readily realigned, and wherein the typical sliding strut-shock units can be measured for proper realignment.

Another object of the present invention is to provide a gauge system that also allows the upper body to be aligned with the lower frame structure to establish a correct relationship between the vehicle structure and its suspension system, particularly with respect to unitized and unibody-constructed automobiles.

Still another object of the invention is to provide a gauge apparatus to realign damaged unitized and unibody-constructed automobiles that incorporates the McPherson-Strut suspension system, whereby the inner structural strut-support elements can be correctly realigned to establish the proper caster/camber alignment of the particular McPherson-Strut-suspension system.

It is another object of the invention to provide a vehicle body-and-frame-alignment apparatus that includes upper and lower horizontal gauge bars adjustably connected by oppositely disposed vertical bars to define a rectangular frame structure, in order to encompass the front end structure of the vehicle body and frame, whereby the inner structure can be properly aligned by two pairs of reference-gauge members slidably supported on each horizontal bar member.

After pulling and squaring the upper sheet metal (using manufacturer's specifications for measurements), the upper pair of reference gauges are positioned on left and right sides of the upper horizontal bar at points equidistant from the center thereof, the reference pointer of each reference gauge being supported on the respective strut tower at a predetermined height. The lower set of reference gauges and their associated pointers are then positioned relative to a given reference point on the underside of the car. Thus, any variation of the lower gauges from the center point of the lower bar will indicate a particular structural misalignment between the upper and lower vehicle structure.

A further object of the invention is to provide an apparatus of this character that allows one to check for the collapse of the McPherson-Strut towers.

It is a further object of the invention to provide an alignment apparatus of this character that comprises relatively few operating parts, and that is easy to employ and maintain.

Still another object of the invention is to provide an apparatus of this character that is relatively inexpensive to manufacture, and that is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a pictorial view of the present invention in a typical operating position relative to a damaged vehicle which is illustrated in phantom lines, the alignment apparatus being supported on a sliding strut-shock system;

FIG. 3 is an enlarged perspective view of a coupling member to position the vertical and horizontal-bar gauge members.

FIG. 4 is an enlarged cross-sectional view taken substantially along line 4—4 of FIG. 3.

FIG. 5 is an enlarged perspective view of an upper reference gauge member;

FIG. 6 is a perspective view of a gauge-support pin that is adjustably mounted in each upper reference-gauge member;

FIG. 7 is a perspective view of a gauge pointer which is adjustably mounted to each of the lower reference-gauge members;

FIG. 8 is an enlarged partial cross-sectional view of the connecting ends of horizontal-bar-gauge members.

DESCRIPTION OF THE PREFERRED EMBODIMENT

Referring more particularly to FIG. 1, there is shown a unibody vehicle, generally indicated at 10, having a front-end-suspension system, designated generally at 12. The suspension system is illustrated as comprising a sliding strut, a concentric coil spring, and a shock absorber to carry the wheel spindle and the brake. This type of suspension system is known in the industry as a McPherson-Strut-type suspension wherein each oppositely disposed strut, generally indicated at 14, is mounted to and within fixed strut towers 16, which are also often referred to as the front inner sheet metal of the vehicle.

When a vehicle such as indicated is damaged because of an accident, the upper body construction and the lower frame structure are very often pushed out of alignment with each other—resulting in further damage to the suspension system, particularly of the type disclosed herein.

Figure 9:
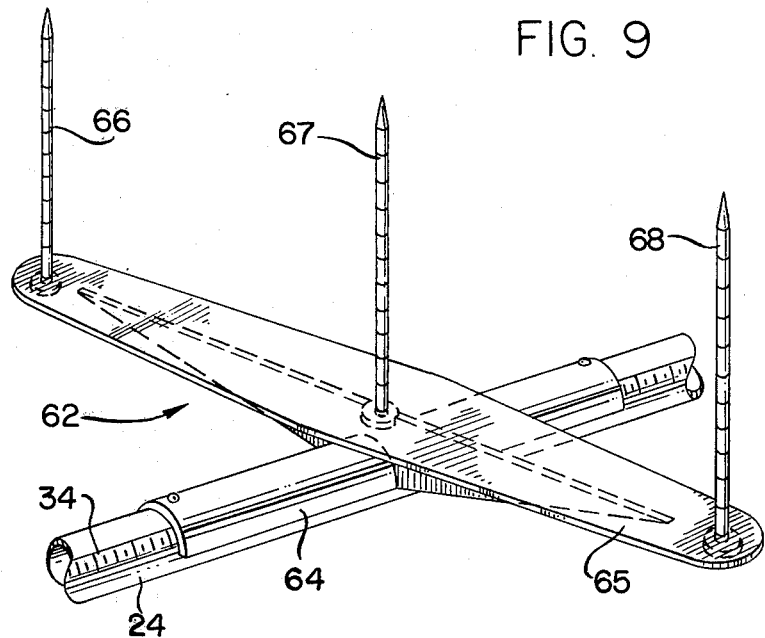
FIG. 9 is a perspective view of an alignment pointer which is centrally positioned on the lower horizontal bar.
Figure 2:
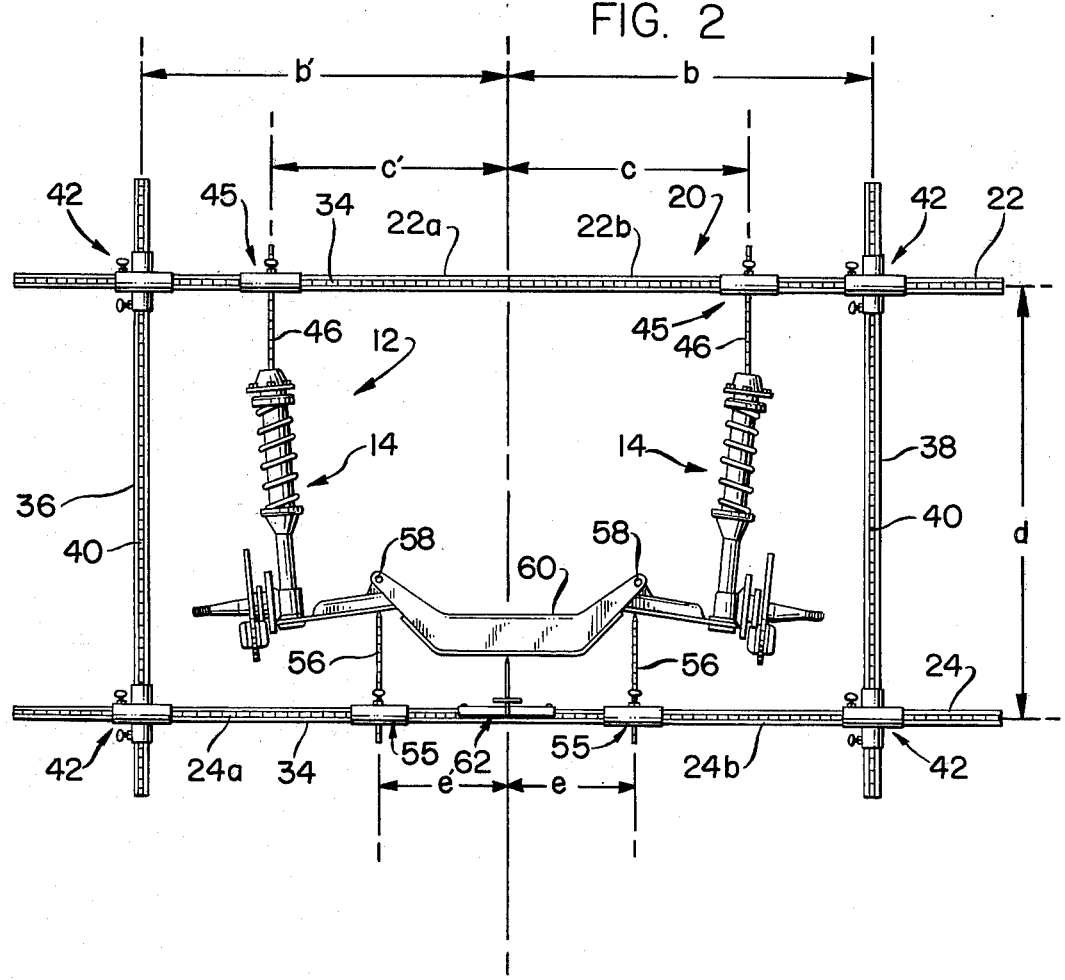
FIG. 2 is a front-elevational view of the body-and-frame alignment apparatus again supported by a sliding strut-shock system, showing the relationship of the apparatus to the vertical center line of the vehicle structure.

In repairing a collision-damaged vehicle, it is very important that the upper and lower portions of the vehicle's body and frame be in vertical alignment, and properly centered with respect to an imaginary center line, such as a—a shown in FIG. 2. Thus, after the upper and lower portions of the vehicle have been squared, they must also be aligned with each other; and the oppositely disposed struts must be realigned so as to have the proper caster/camber alignment.

Accordingly, in order to accomplish the realignment of the body and frame sections and the strut-suspension system, a pulling and squaring of the sheet metal takes place, using the manufacturer's specifications and measurements. The major repair and realignment is done by eye, and the critical realignment must be accomplished with the aid of a gauge device. Thus, the present body-and-frame-alignment apparatus is employed by suspending the apparatus about the front end of the vehicle in the manner illustrated in FIGS. 1 and 2.

It is important to note that, with the apparatus as herein disclosed, it is not necessary to dismount and/or reassemble vehicle components such as the engine, front-end, gearbox, etc., to provide precision measurements for realignment thereof.

The present apparatus comprises a substantially rectangular adjustable frame gauge, indicated generally at 20, and is constructed having an upper horizontal gauge bar 22, and a lower horizontal gauge bar 24, each horizontal bar having a sufficient length to extend outwardly from both sides of the vehicle body.

Preferably, the horizontal gauge bars are formed in two half sections or members. That is, horizontal bar gauge 22 includes half sections 22a and 22b; and bar gauge 24 is formed in sections 24a and 24b which are releasably connected by any suitable releasable connecting means, such as shown in FIG. 8. As an example, section 22a is defined by a tubular bar having a specified inner diameter 25 which is adapted to receive the outer reduced-diameter member 26 of tubular bar 22b. The extended member 26 includes a spring latch 28 having latch pin 30 secured to one end thereof which projects outwardly from hole 32, so as to be removably received in hole 33 of the wall of tubular bar 22a.

When each section of the upper and lower horizontal bars is connected, there is formed a continuous measurement means disposed along the longitudinal surface, wherein the measurement means comprises a suitable measuring scale 34 starting with "0" (zero) at the connecting center point between the two half sections 22a and 22b, and 24a and 24b. The scale increases outwardly to each opposite end thereof, thus reading either in inches or in meters.

To complete the rectangular frame structure 20, a pair of vertical side gauge bars 36 and 38 are provided and adjustably mounted to the opposite ends of the horizontal-bar members 22 and 24. The vertical side gauge bars are also preferably of a lightweight metal tubing having a measuring scale 40, similar to scale 34 on the horizontal bar members.

Adjustable mounting means 42 are provided to form the four corner junctions of the frame structure 20, the mounting means 42 comprising a coupling bracket having a pair of short tubular sleeves 44 affixed to receive and secure the respective vertical and horizontal bar members adjacent their free ends, as shown in FIG. 3. Each sleeve thereof includes a means for locking the respective bars in a predetermined position, the locking means being illustrated as a thumb nut which engages the bar members.

The placement of the vertical side bars 36 and 38 will depend upon the vehicle that is being realigned. However, the vertical bars must at all times be positioned at identical measured locations on the left and right sides, equidistant from the center point of the horizontal-bar members. That is, b and b' must be spaced equidistant from center line a—a, which is indicated by "0" on the measuring tape or scale 34.

After the horizontal bars 36 and 38 are correctly positioned and spaced apart as indicated at d in FIG. 2, a pair of oppositely disposed reference gauges 45 are adjusted at a given point to the left and to the right of the center line. The given points or distances c and c' are the measurements given by the vehicle manufacturers for the distance between the struts 14. That is, when the struts are correctly in alignment with each other, they should be able to support the frame structure 20 by means of gauge-support pins 46 which form part of the reference gauges 45.

Each reference gauge 45 comprises a sleeve member 48 arranged to slide over the upper horizontal gauge bar 22 and to lock into position by a locking means, again shown as a thumbscrew 50. Sleeve 48 includes a lateral member 52 arranged to adjustably receive pin 46, whereby the frame structure 20 can be adjusted to an equal height level.

Thus, it can be seen that any different measurements between c and c′ will indicate a strut misalignment; and any variation in the attitude of the horizontal bars, after the pins have been set, will indicate a different problem in the strut or its related elements. An adjustment can then be readily made to solve the problem.

Once the upper section of the vehicle-body structure is in true alignment, the lower portion of the unibody must then be checked. Slidably mounted to the lower horizontal-gauge bar 24 is a second pair of reference gauges 55, each including a reference pointer 56. Thus, the lower reference gauges must be oppositely positioned to the right and to the left of the center line 2—2, as shown in FIG. 2. Each guage is located so that its respective pointer 56 is positioned adjacent a given reference point on the vehicle, such as the respective bolts 58 of the cross member 60. The distance between bolts 58 is usually provided by the vehicle manufacturer. Hence, as an example, if the left reference gauge reads 12 inches (distance e′) and the right gauge reads 13 inches (distance e), this would indicate a pull of the inner structure to the short side is necessary to square the vehicle structure from top to bottom.

A central alignment indicator 62 can also be provided which comprises a mounting bracket member 64 adapted to be secured to the lower horizontal-gauge bar 24 at the central point thereof, the bracket 64 including a transverse plate 65 to which is affixed three reference pointers 66, 67 and 68. This indicator can be used as an additional gauge to aid in the alignment of the inner front-body components, or to be used in cooperation with the other body-shop gauge instruments for the original alignment of the body-frame structure.

Accordingly, when all of the reference functions are carried out and all of the reference gauges are equally arranged, as shown in FIG. 2, the vehicle is in true alignment without any guesswork.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A vehicle body-and-frame-alignment apparatus for use in realigning the front-end structures of damaged unitized or unibody constructed vehicles which employ a pair of sliding strut-shock units as a front-end-suspension system, said apparatus comprising a substantially rectangular adjustable frame-gauge structure defined by:
   an upper horizontal-gauge bar adapted to be positioned transversely over said strut-shock units;
   a lower horizontal-gauge bar oppositely positioned to and in parallel relation with said upper horizontal-gauge bar, and adapted to be positioned transversely under said strut-shock units;
   a pair of oppositely disposed vertical-gauge bars interconnected between said upper and lower horizontal-gauge bars, and adapted to be located on respective sides of said vehicle body;
   means for adjustably mounting said gauge bars to form said substantially rectangular frame-gauge structure about said front-end structure of said vehicle;
   a first pair of gauge-positioning members slidably mounted to said upper horizontal bar so as to be selectively positioned on said sliding strut-shock units to support said frame-gauge structure about said vehicle body; and
   at least one other gauge-positioning member slidably mounted to said lower horizontal bar to be selectively positioned at a given reference point on said vehicle.

2. A vehicle body-and-frame-alignment apparatus as recited in claim 1, wherein said first and second gauge-positioning members define reference gauges, including means for locking said reference gauges in selective positions.

3. A vehicle body-and-frame-alignment apparatus as recited in claim 2, wherein each of said first reference gauges comprises:
   a sleeve member adapted to be slidably supported on said upper horizontal-gauge bar;
   a vertically adjustable support pin mounted to said sleeve member, said pin being adapted to mount on respective sliding strut-shock units, whereby the distance between said shock units can be determined; and
   means for selectively positioning said support pin vertically relative to said upper gauge bar.

4. A vehicle body-and-frame-alignment apparatus as recited in claim 3, wherein each of said second reference gauges comprises:
   a sleeve member adapted to be slidably supported on said lower horizontal-gauge bar;
   a vertically adjustable reference pointer mounted to the associated sleeve member; and
   means for selectively positioning said reference pointer vertically with respect to said lower gauge bar.

5. A vehicle body-and-frame-alignment apparatus as recited in claim 4, wherein each of said gauge bars includes a measuring means to determine the position of said reference gauges thereon.

6. A vehicle body-and-frame-alignment apparatus as recited in claim 5, wherein said measuring means comprises a scale disposed longitudinally along the length of each gauge bar.

7. A vehicle body-and-frame-alignment apparatus as recited in claim 6, wherein said scale is formed having an "0" (zero) point centrally positioned midpoint between the ends of said upper and lower gauge bars.

8. A vehicle body-and-frame-alignment apparatus as recited in claim 6, wherein said adjustable mounting means for said gauge bars comprises:
   a coupling bracket having a pair of fixed cross-sleeve members; and
   locking means on each sleeve member to lock said gauge bars in a selective spaced relationship.

9. A vehicle body-and-frame alignment-apparatus as recited in claim 1, including a central alignment indicator and a plurality of fixed pins, said indicator adapted to be mounted to said lower horizontal-gauge bar.

10. A vehicle body-and-frame-alignment apparatus as recited in claim 7, wherein said upper and lower horizontal-gauge bars are formed having a pair of half sections removably connected to each other, and latching means provided on said half sections to latch said sections together to form a single gauge bar.

* * * * *